Fig. 2

MICHAEL L. HOFFMAN
INVENTOR.

BY
ATTORNEY

MICHAEL L. HOFFMAN
INVENTOR.

BY Max Golden

ATTORNEY

United States Patent Office 3,625,017
Patented Dec. 7, 1971

3,625,017
SEPARATION OF COMPONENTS OF HYDROGEN AND HYDROCARBON MIXTURES BY PLURAL DISTILLATION WITH HEAT EXCHANGE
Michael L. Hoffman, Los Angeles, Calif., assignor to McDonnell Douglas Corporation, Santa Monica, Calif.
Continuation-in-part of application Ser. No. 735,247, June 7, 1968. This application Nov. 1, 1968, Ser. No. 772,563
Int. Cl. F25j 3/02
U.S. Cl. 62—26
11 Claims

ABSTRACT OF THE DISCLOSURE

Method and system particularly designed for separating hydrogen and methane, and ethylene, from mixtures thereof, also generally containing heavier hydrocarbons, which involves cooling a compressed feed mixture, e.g., one containing hydrogen, methane, ethylene, and heavier hydrocarbons including ethane and propylene, preferably to a substantially saturated vapor, by heat exchange with cold product gas streams and by external refrigeration, passing the cooled substantially saturated feed vapor mixture in indirect heat exchange relation with the fluid from the lower portion of a distillation column at several different temperature levels, such feed mixture also being subjected to external refrigeration at several different temperature levels and effecting a non-adiabatic distillation in the column and a partial condensation of the feed vapor. The exiting partially condensed feed mixture from the column is phase separated into a vapor consisting essentially of hydrogen and methane, and a liquid consisting essentially of methane and ethylene. The liquid is introduced as feed into the distillation column, and a separation is effected therein into an overhead vapor of methane and a bottom liquid product of ethylene and any heavier hydrocarbons present in the feed mixture. The overhead methane vapor is passed in heat exchange relation with at least a portion of the compressed feed mixture for cooling same, is further cooled, and condensed, and recirculated to the top of the distillation column as reflux. The cold hydrogen and methane stream from the phase separator is passed in heat exchange relation with compressed feed mixture and recirculated overhead methane for cooling same. This process and system are designed to effect an efficient separation particularly by recovering and effectively utilizing refrigeration in a thermodynamically reversible manner, resulting in a reduction of compressor power cost.

---

This application is a continuation-in-part of my co-pending application Ser. No. 735,247, filed June 7, 1968.

This invention relates to the separation of components of mixtures of hydrogen and hydrocarbons, particularly mixtures containing hydrogen, methane, ethylene, and heavier hydrocarbons such as ethane and propylene, by rectification, and is particularly concerned with procedure for the separation of hydrogen and methane as by-products, from ethylene and the remaining heavier hydrocarbons, employing non-adiabatic distillation in the column and permitting column refrigeration to be available at temperatures sufficiently low to permit useful cooling of the feed within the column, and thus substantially reducing the load on the heat exchangers and reducing compressor power cost.

In the process for producing ethylene, a propane or ethane feed stock is reacted to produce a complex mixture of straight chain hydrocarbons and hydrogen. Hydrogen and methane are separated and may be sold as by-products or used as a plant fuel. The remaining fraction contains ethylene and heavier hydrocarbons. The latter mixture can then be separated into a pure ethylene product and a heavy hydrocarbon fraction which may be either recycled or sold as by-product.

Prior art processes and techniques for effecting the above noted separation have utilized refrigeration in the distillation or rectifying column at reboiler temperatures. These processes and systems involve the use of many heat exchangers and refrigeration units to obtain the required refrigeration, and the expenditure of high compressor power, and result in increased costs of operation.

The present invention is a substantial improvement over the above noted prior art processes in that the invention process involves the recovery of refrigeration within the main distillation column at temperatures substantially below the temperature of the reboiler at which such recovery is usually accomplished in prior art procedures. The invention process is designed to recover and effectively utilize such refrigeration, resulting in substantial savings in compressor power and cost of operation. Thus, for example, the process and system of the invention can result in a 35% compressor power saving over prior art processes which only utilize column refrigeration at reboiler temperatures.

Briefly, the concept of the invention for recovery of refrigeration within the main column at low temperatures, and particularly designed for economical separation of the above noted gas mixtures, includes the provision of heat exchange means or heat exchangers along the lower or stripping section of the distillation column, and the passage of cooled compressed feed gas mixture through such heat exchangers in indirect heat exchange relation with fluid from various levels or stages of the stripping section of the column to provide for addition of heat to said fluid at various temperature levels and cooling of said feed gas mixture. Such heat exchangers can be positioned within the distillation column or externally thereof, as described in detail hereinafter. There is also provided external refrigeration means for such feed gas mixture at various temperature levels, thereby additionally cooling and condensing a substantial or major portion of the feed gas mixture by passage of such feed gas mixture through such refrigeration means. A non-adiabatic distillation thus takes place in the column and permits refrigeration to be available at temperatures sufficiently low to permit useful cooling of the feed gas mixture, substantially reducing the load on heat exchangers, and on the recycle compressor, if employed, and effecting an efficient rectification in the column.

Although the above concept is employed in the present invention particularly for the separation of components of hydrocarbon mixtures, it is applicable generally for the separation of components of gas mixtures, wherein at least two of said components have different boiling points, and wherein said feed mixture is cooled substantially prior to introduction of such mixture as feed into the distillation column.

More specifically, there is provided a process and system for separating hydrogen and methane, and ethylene, from mixtures thereof, which can also contain heavier hydrocarbons, i.e., higher molecular weight hydrocarbons, which comprises compressing such a feed gas mixture, cooling the compressed feed gas mixture, preferably but not necessarily essentially to a saturated vapor, passing said cooled and preferably saturated feed gas mixture in indirect heat exchange relation with the contents or fluid from the lower portion of a distillation column at a plurality of different temperature levels therein, said feed mixture being cooled during said heat exchange by addition of heat to said fluid from said feed mixture, and by refrigeration of said feed mixture externally of said column at a plurality of different temperature levels, thereby condensing a portion of said cooled feed gas mixture, separating the resulting cooled partially condensed feed mixture into a vapor consisting essentially of hydrogen and methane, and a liquid consisting essentially of methane and ethylene, introducing said liquid as feed into said distillation column, effecting a separation of said feed in said column into an overhead methane vapor and a liquid bottom product consisting essentially of ethylene, and any heavier hydrocarbons present, cooling and condensing at least a portion of said overhead methane vapor, and returning said cooled condensed methane as reflux to the top of said distillation column.

According to one embodiment of the invention, the cooled compressed feed gas mixture is passed in a plurality of different temperature stages vertically in indirect heat exchanger relation through the lower or stripping section of the main distillation column to effect further cooling of said feed mixture, and between such adjacent stages the compressed feed mixture is also additionally cooled externally of the column, e.g., by passage of the feed gas mixture in heat exchange relation with an external refrigerant, as will be described more fully hereinafter, to effect the above noted non-adiabatic distillation and recovery of refrigeration within such column at relatively low temperatures, resulting in the above noted efficient operation. In certain other embodiments, a portion of the cooled compressed feed mixture is passed in a plurality of different temperature stages, as noted above, in heat exchange relation through the lower portion of the column, and a portion of such feed gas mixture is separately passed through a plurality of external refrigerators at different temperature levels, and the two portions of partially condensed feed mixture are then combined.

According to another embodiment of the invention, the cooled compressed feed gas mixture is passed along and externally of the lower portion of the main distillation column in heat exchange relation with the fluid or contents from the lower portion of the column, and such compressed feed mixture is also passed in heat exchange relation with external refrigerant to effect the above-noted non-adiabatic distillation. This can be accomplished by passing the cooled feed gas mixture through a plurality of heat exchangers positioned vertically along and externally of the lower portion of the main distillation column, in heat-exchange relation with fluid, i.e., vapor-liquid mixture, removed from a plurality of temperature levels within the column, passed through such separate heat exchangers and the partially vaporized fluid exiting such heat exchangers injected back into the column at a plurality of temperature levels. Also during such heat exchanger with the column fluid from the lower portion of the column, the cooled compressed feed mixture is passed in heat exchange relation externally of said column with a refrigerant at different temperature levels, such heat exchange with external refrigerant preferably being carried out between the heat exchange stages for the feed gas mixture and the column fluids, to effect a further cooling of the feed gas mixture.

The vapor separated from the resulting compressed partially condensed feed gas mixture generally contains, in addition to hydrogen and methane, a small amount of ethylene. In preferred practice, it is desirable to recover such ethylene together with the major portion of ethylene in the separated liquid, which is fed to the distillation column and rectified therein. For this purpose, it is desirable to separate such vapor into a second vapor and a second liquid, the second vapor consisting essentially of hydrogen and methane and substantially free of ethylene, and the second liquid consisting essentially of methane and ethylene and substantially free of hydrogen. Such last-mentioned separation can be accomplished by rectification of the vapor initially separated from the cooled partially condensed feed gas mixture, or by other means such as by suitable cooling and condensation of such vapor, as described in detail in the embodiments below.

The above-noted second liquid can then be introduced as a portion of the feed to the distillation column, e.g., by combining it with the main portion of the liquid initially separated from the compressed partially condensed feed gas mixture.

By-product streams such as the hydrogen and methane stream, and the overhead methane stream from the main distillation column, separated in the process, preferably are passed in heat exchange relation with at least a portion of the compressed feed gas mixture and with methane recycled as reflux, for cooling same, and in preferred operation a portion of the overhead methane from the distillation column is expanded and cooled and passed in heat exchange relation with at least a portion of the compressed feed gas and the recirculated methane for further cooling thereof as described hereinafter, and the resulting heat expanded methane recovered as product.

Although in preferred practice for most efficient operation the compressed feed gas passed in heat exchange relation with the column fluid along the lower portion of the main distillation column at several different temperature levels as above described, is initially cooled to a substantially saturated vapor, if desired, such initial cooling can be carried out to an extent such that the resulting cooled compressed gas feed is not saturated, but sufficient cooling is afforded during heat exchange with the fluid in the lower portion of the column and by external refrigeration to condense a portion of the cooled feed gas mixture as above described. However, the latter mode of operation is not desirable since it does not afford the most efficient mode of operation.

The invention will be understood more clearly by the description below of certain preferred embodiments taken in connection with the accompanying drawing wherein:

FIG. 2 is a modification of the system as shown in FIG. 1;

Figure 1:
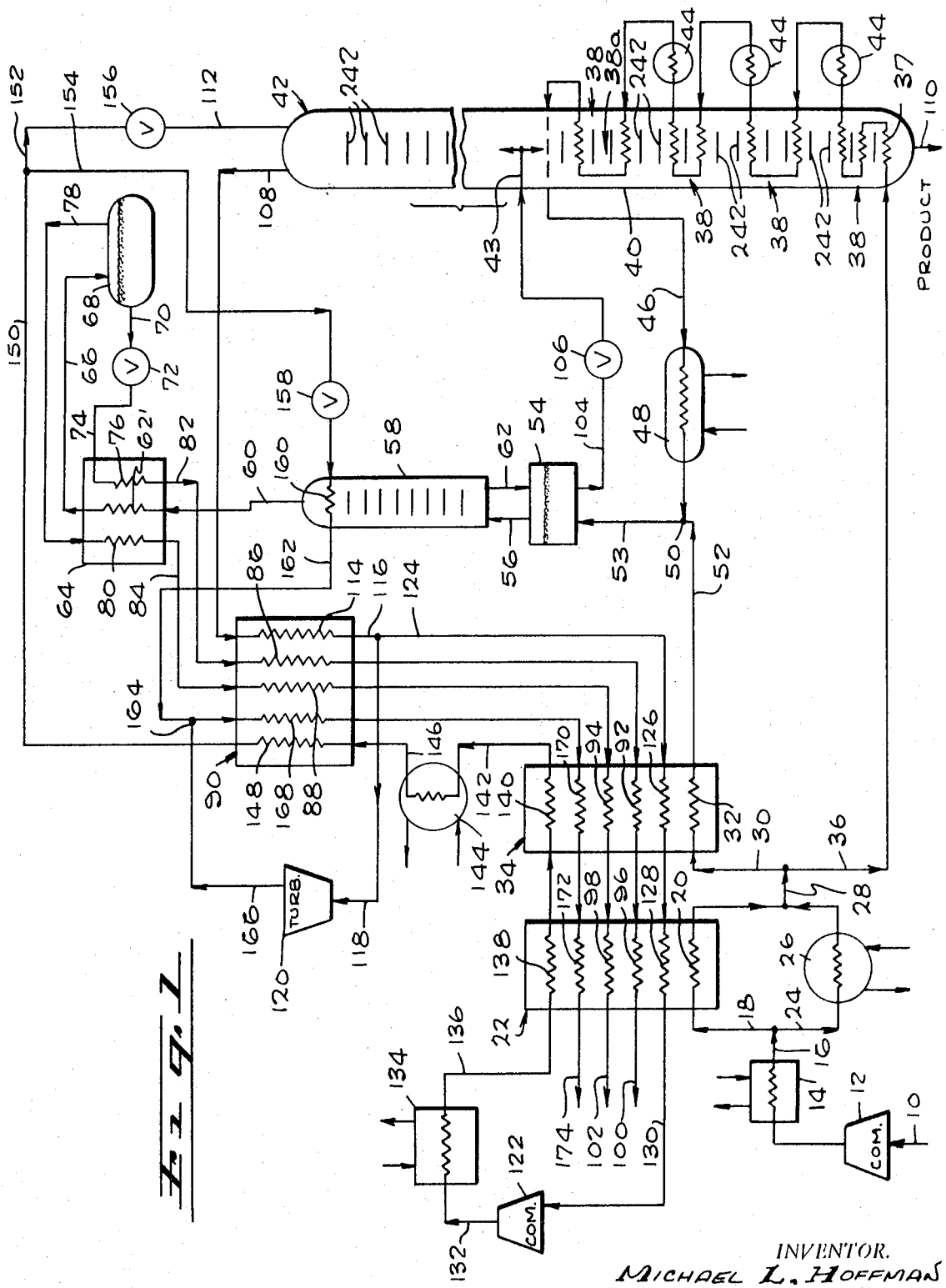
FIG. 1 is a schematic representation of one preferred form of separation system according to the invention.

Referring to FIG. 1 of the drawing, a feed gas mixture is provided at 10, such feed gas mixture containing substantial proportions of methane and ethylene and generally a smaller but significant amount of hydrogen. Thus, the feed gas mixture can contain from about 10% to about 20% hydrogen, about 10% to about 40% methane, about 20% to about 50% ethylene, and the remainder heavier hydrocarbons such as ethane and propylene.

As a specific example of a feed gas mixture 10 processed according to the invention, is the mixture containing 17% hydrogen, 32% methane, 32% ethylene, 7% ethane and 12% propylene. It is desired to separate this mixture into three streams, one containing approximately 75% hydrogen with the remainder methane, another containing essentially pure methane, and a third consisting of ethylene and the remaining heavier hydrocarbons. Such specific exemplary feed gas mixture 10 is compressed at 12 to approximately 250 p.s.i.a. and cooled to ambient temperature in a water cooled after-cooler 14. It is then split into two streams at 16, one stream 18 (about 50% of the feed) is cooled to saturated vapor conditions, approximately to 450° R. (Rankin) by passage through coil 20 of heat exchanger 22 by out-going vapor products in heat exchanger 22, and the remainder 24 is cooled by external refrigeration in refrigerator 26, also to saturated vapor.

The saturated vapor products from coil 20 of exchanger 22 and refrigerator 26 are combined at 28 and then redivided, approximately 10% of such stream at 30 being cooled by passage through coil 32 of a second heat exchanger 34 against out-going vapor products. The remaining portion of vapor stream 28, at 36 is passed first through reboil coil 37, and then in indirect heat exchange relation through coils or heat exchangers 38 in the lower portion or stripping section 40 of a main distillation column 42. It will be noted that each of the coil arrangements or heat exchangers 38 is disposed vertically in the lower portion of the column so that the saturated feed vapor mixture at 36, passes upwardly in the lower portion of the column through the successive heat exchangers 38. This unique arrangement provides for the addition of heat from the cooled and compressed saturated feed vapor 36 introduced into the lower portion of the column, at various temperature levels between the temperature of the feed entering the column at 43, approximately 315° R., and the temperature at the bottom of the column at about 423° R.

Following passage of the cooled compressed feed mixture through each of the heat exchangers 38, the fluid exiting these respective exchangers is further cooled in external refrigerators 44 at different temperature levels. Thus, it is seen that the cooled saturated compressed feed mixture at 36 is cooled alternately by addition of heat to the distillation column in each of the exchangers 38 and by external refrigeration in refrigerators 44 at several temperature levels. Following passage of the compressed feed mixture through the uppermost heat exchanger 38, also designated 38a, in the stripping section 40 of column 42, such feed gas mixture is now cooled so that it is approximately 65% condensed at which point the temperature is about 315° R.

It will be understood that the number of refrigeration levels or separate heat exchangers 38 in the column and alternate refrigerators 44 can be varied depending upon conditions such as the actual composition of the feed and the final optimization of plant components. Usually, the number of refrigeration levels or separate heat exchangers 38 in the column can vary from about 3 to about 10, with about 2 to about 5 external refrigerators 44.

The cooled exiting feed mixture at 46 is further cooled and condensed in refrigerator 48 and is recombined at 50 with the minor portion of previously divided compressed cooled saturated feed mixture 52, and the combined feed mixture is fed at 53 to a phase separator 54. The vapor from separator 54, consisting of about 52% hydrogen, 45% methane and 3% ethylene, is then removed at 56 and is fed to a rectifying column 58 where the mixture is separated into a vapor overhead at 60, consisting of approximately 55% hydrogen and 45% methane, and substantially free of ethylene. A liquid bottoms product amounting to about 6% of the plant feed and having a composition of approximately 50% methane and 50% ethylene, and substantially free of hydrogen, is removed from rectifier 58 at 62, and returned to separator 54.

The vapor stream 60 is further cooled and partially condensed in coil 62' of heat exchanger 64 to a temperature of approximately 230° R. at 66. The stream is then fed to vapor-liquid separator 68, from which the liquid methane at 70 is expanded across throttling valve 72 to a pressure of approximately 40 p.s.i.a., causing the temperature to drop to approximately 210° R. This throttled liquid at 74 is then passed through coil 76 of heat exchanger 64, providing cooling in that exchanger by evaporating the liquid. The vapor steam 78 from separator 68, amounting to about 22% of the feed, and containing 75% hydrogen and 25% methane, is returned through coil 80 of heat exchanger 64 to provide additional cooling therein for the countercurrent vapor stream at 62. The exiting methane stream 82 and the exiting hydrogen and methane stream 84 from exchanger 64 are passed through coils 86 and 88, respectively, of heat exchanger 90; through coils 92 and 94, respectively, of heat exchanger 34; and through coils 96 and 98, respectively, of heat exchanger 22; and such stream thus provides cooling in heat exchangers 90, 34 and 22, and then are discharged as by-products at 100 and 102, respectively.

The liquid from separator 54, containing approximately 70% of the feed, is removed at 104 and expanded through throttling valve 106 to a pressure of 160 p.s.i.a., the pressure in column 42, and is fed to the distillation column at 43. In the distillation column such feed is separated into an overhead methane vapor at 108, in the amount of about 20% of the feed, and the remaining 50% of the feed is taken off as a liquid bottom product at 110, consisting of ethylene plus all heavier hydrocarbons present in the feed, including the ethane and propylene. As previously noted, the compressed cooled saturated feed at 36 passing through the heat exchangers 38 in the bottom of column 42 provide for addition of heat to the lower portion of the column at various temperature levels, according to the invention, and the major portion of the methane overhead vapor at 108 is cooled, compressed and condensed, and recycled at 112 to the top of the column to provide reflux to the column, as will be described more fully hereinafter. As result of the indirect heat exchange in exchangers 38 between compressed saturated feed at different temperature levels in the lower portion of the column, a nonadiabatic distillation takes place in the column, allowing column refrigeration to be available at temperatures sufficiently low to permit useful cooling of the feed, and thus substantially reduces the load on the refrigerators 44 and refrigerator 48, as well as the other refrigerators 26 and 144 in the system.

The overhead methane vapor at 108 is warmed by passage through coil 114 of heat exchanger 90 and the exiting stream 116 is divided into a first stream 118, constituting about 10% of the feed, and is expanded in turbine 120 to 75 p.s.i.a. and cooled to a temperature of 255° R. Useful work can be obtained from this turbine, either by coupling with a generator or by gearing to the shaft of compressor 12 or compressor 122 in the system.

The remainder of the methane stream 116, at 124, constituting approximately 23% of the feed, is warmed by passage through coil 126 of the heat exchanger 34 and coil 126 of heat exchanger 34 and coil 128 of heat exchanger 22, to provide further cooling therein, and the exiting methane stream at 130, at ambient temperature, is recompressed by compressor 122 to about 450 p.s.i.a.

The high pressure discharge stream 132 from compressor 122 is after-cooled at 134, and the cooled compressed stream 136 is then further cooled by passage through coils 138 and 140 of heat exchangers 22 and 34, respectively, to saturated methane vapor at approximately 320° R., and the resulting saturated vapor at 142 is then partially condensed in refrigerator 144.

The partially condensed liquid at 146 is then further cooled and condensed by passage through coil 148 of heat exchanger 90 to a temperature of approximately 270° R. The resulting fluid at 150 is then split into two streams, 152 and 154. The larger compressed liquid methane stream 152 containing approximately 13% of the feed, is throttled in valve 156 to 160 p.s.i.a., the pressure in column 42, and is fed at 112 to the top of column 42 as reflux.

The smaller compressed liquid methane stream 154, containing about 10% of the feed, is throttled in valve 158 to approximately 75 p.s.i.a. The throttled stream is evaporated by passage through coil 160 in a heat exchanger at the top of the rectifier column 58, thus providing reflux for that column. The exiting methane vapor at 162, is combined at 164 with the methane turbine discharge 166, also at 75 p.s.i.a., and this combined methane stream is then passed through coil 168 of heat exchanger 90, coil 170 of heat exchanger 34, and coil 172 of heat exchanger 22, to provide additional cooling for such heat exchangers, and is removed as methane product at 174.

It is accordingly seen that essentially three product streams are obtained, one containing hydrogen and methane, and discharged at 100 and 102; a second stream of pure methane discharged as product at 174; and a third stream of ethylene, ethane and propylene, discharged at 110.

If desired, the feed pressure can be increased to about 500 to 600 p.s.i.a. Under these conditions, the feed mixture would be about 75% condensed at 53, and the vapor at 56 would contain about 64% hydrogen, about 33% methane, and about 3% ethylene. In such process and system, rectifier 58 and heat exchanger 90 could be eliminated and a modified system used for separating and removing the ethylene from the above vapor at 56. Such a modified system is illustrated in FIG. 2 of the drawing.

Figure 2:
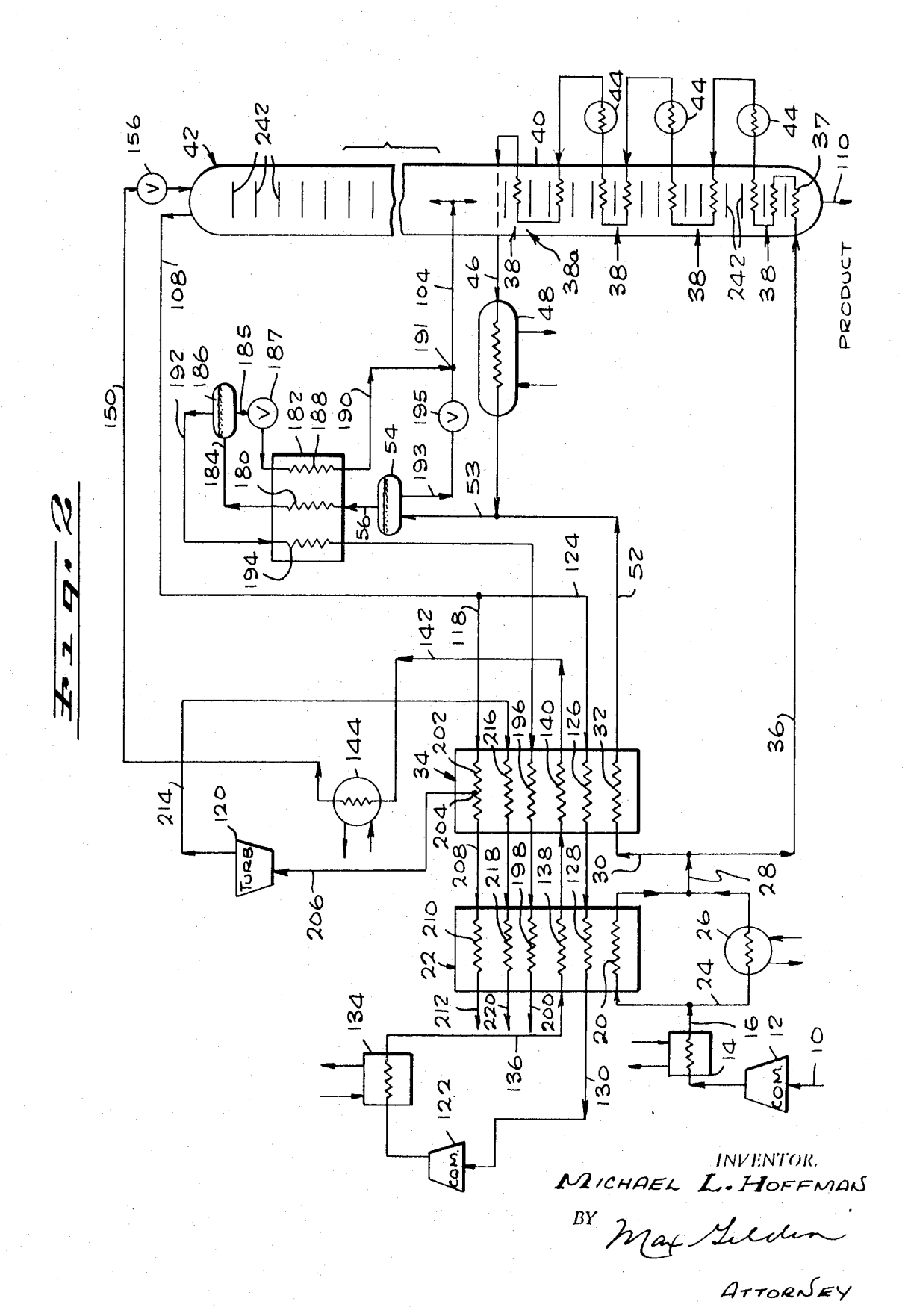

Referring to FIG. 2, wherein the same numerals employed therein as in FIG. 1 correspond to the same components, the vapor 56 from separator 54 is first cooled and partially condensed by passage through coil 180 of heat exchanger 182, and the exiting partially condensed vapor is then fed at 184 to a separator 186. The liquid withdrawn at 185 from separator 186, consisting essentially of methane, is throttled at valve 187, to 160 p.s.i.a, the pressure in column 42, and is then passed through coil 188 of the heat exchanger 182 to provide cooling therein, and the exiting fluid 190 is combined at 191 with liquid withdrawn at 193 from separator 54 and which is throttled at valve 195 to column pressure, 160 p.s.i.a. The so combined streams at 104 are then introduced as feed to column 42.

The exiting vapor at 192 from the separator 186, and containing 75% hydrogen and 25% methane is passed through coil 194 of heat exchanger 182 to provide further cooling therein, and the exiting mixture is then passed through coil 196 of heat exchanger 34 and coil 198 of heat exchanger 22, and is discharged at 200.

The overhead methane 108 from column 42 is divided into the two streams 118 and 124 as described above in connection with FIG. 1, but in FIG. 2 stream 118 is passed through coil 202 of heat exchanger 34, and a portion of such stream is taken off at an intermediate point 204 of coil 202 and is fed via 206 to turbine or work expander 120, and the remainder of such stream at 208, is passed through coil 210 of heat exchanger 22 and discharged at 212. The expanded methane stream from turbine 120, at 214, is then passed through coils 216 and 218 of heat exchangers 34 and 22, respectively, and discharged at 220.

In FIG. 2, the second stream 124 divided from the overhead methane stream 108, following compression at 122 and cooling of the compressed methane stream by passage through coils 138 and 140 in heat exchangers 22 and 34, respectively, and condensation in refrigerator 144, is fed entirely via 150 and throttling valve 156 to column 42.

The pressure in distillation column 42 in the system described above and illustrated in FIG. 1, can be increased up to the feed pressure, i.e., 250 p.s.i.a. This would reduce the work required in compressor 122, but would also decrease the effectiveness of refrigeration in distillation column 42. In the system of FIGS. 1 and 2, if the feed is above 450 p.s.i.a. and distillation column 42 is at the feed pressure, compressor 122 could be eliminated.

Reference to the system of FIG. 1, if a hydrogen product containing 55% hydrogen and 45% methane were satisfactory, heat exchanger 64 and separator 68 could be eliminated. In such a modification, referring to FIG. 1, the liquid stream at 70 would be eliminated and overhead vapor stream 60 from rectifying column 58 would go directly to coil 88 of heat exchanger 90.

In the systems of FIGS. 1 and 2, if it is not desired to recover in the product at 110, the 3% ethylene in the hydrogen-methane vapor at 56, then in the system of FIG. 1, rectifier 58, heat exchanger 64 and separator 68, and their associated lines and components can be eliminated, and vapor 56 passed directly to coil 88 of heat exchanger 90 and passed through coils 94 and 98 of heat exchangers 34 and 22, respectively, and recovered as product at 102, and eliminating 86, 92 and 96. For the same purpose, in the system of FIG. 2, heat exchanger 182 and separator 186 and their associated lines and components can be eliminated, and vapor 56 passed directly through coils 196 and 198 of heat exchangers 34 and 22, respectively, and recovered as product at 200.

Figure 3:
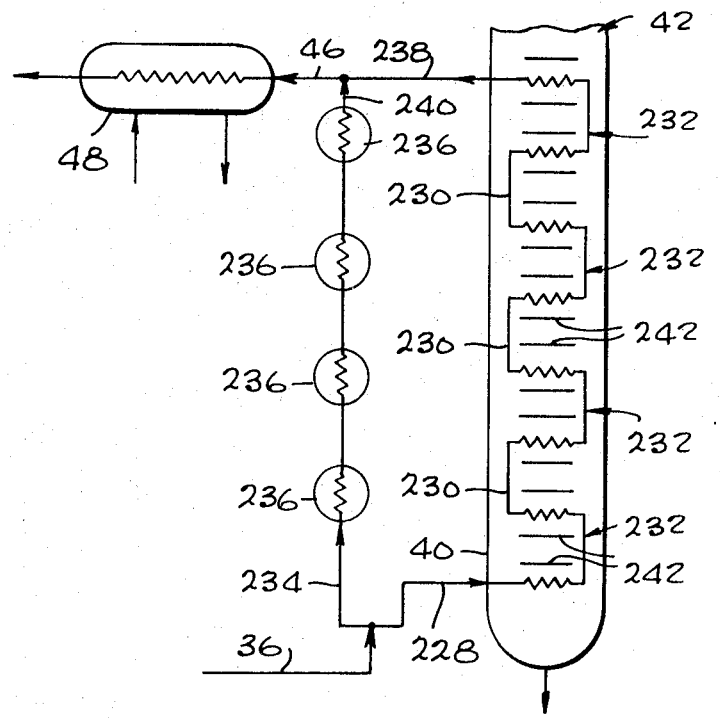
FIG. 3 shows another embodiment of the system of FIGS. 1 and 2.
Figure 4:
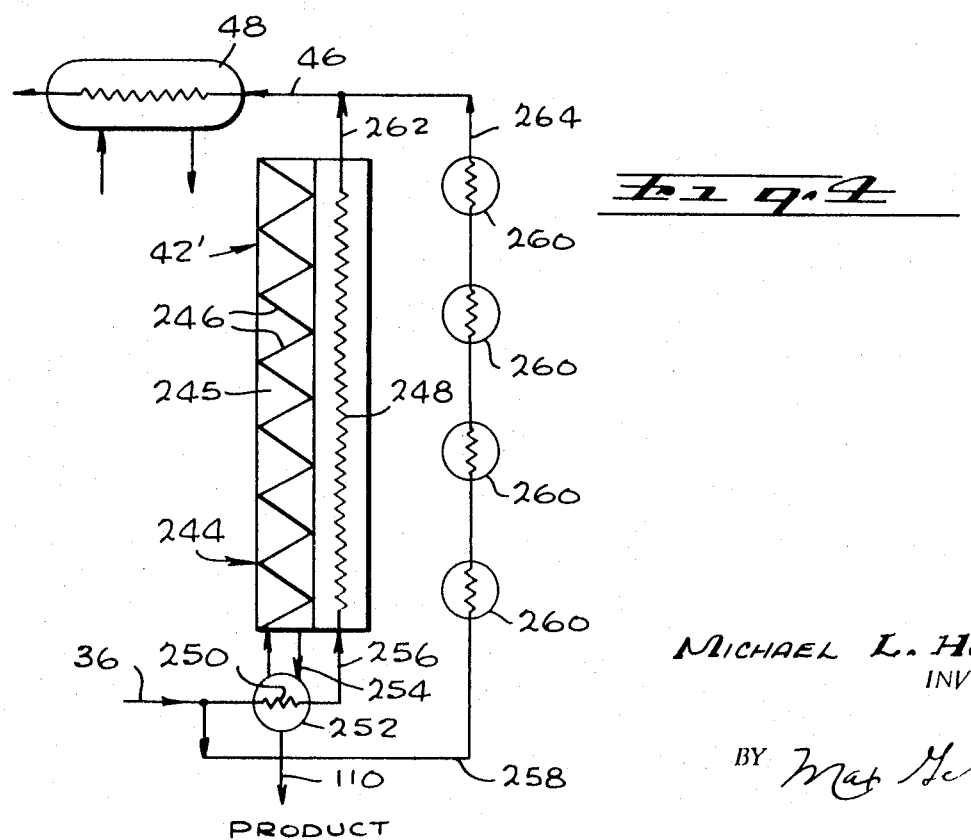
FIG. 4 shows still another embodiment of the invention.

FIGS. 3 and 4 show modified systems for cooling the compressed saturated feed mixture at different temperature levels in heat exchange relation with the lower portion of the column, and by external refrigeration at different temperature levels. In the embodiment of FIG. 3, a portion, e.g., about 50%, of the feed at 36 is passed at 228 consecutively via connections 230, through each of the four heat exchangers indicated at 232 in the lower portion 40 of column 42, and the remaining 50% of the feed 36, is passed at 234 consecutively through each of the external refrigerators 236, and the partially condensed exiting feed mixtures at 238 and 240, are combined to form the partially condensed stream 46 which is then conducted to refrigerator 48 for further cooling.

The heat exchangers or constructions 38 and 232 in FIGS. 1, 2 and 3, for passage of the compressed saturated feed mixture into indirect heat exchange relation with the lower portion of column 42, can be in the form of any suitable heat exchanger constructions, and in the showings of FIGS. 1, 2 and 3, in column 42 additionally contains the conventional trays or bubble plates 242 or equivalent members conventionally employed in distillation columns in the art.

In the embodiment of FIG. 4, the column 42', which is otherwise similar to column 42, has its lower portion or stripping section 244 in the form of a plate-fin heat exchanger having channels 245 containing corrugated plates 246 having slots (not shown) therein, bearing the liquid-vapor mixture being separated in the column 42', in indirect heat exchange relation with channels indicated at 248. Such heat exchanger construction is well known in the art and forms no part of the present invention.

A portion, e.g., about 50%, of the compressed saturated feed mixture at 36, is passed via coil 250 in heat exchange relation through a reboiler 252 into which bottom product from the column is withdrawn at 254, and the exiting saturated feed mixture at 256 is passed upwardly through the channels or passages indicated at 248 in heat exchange relation with the column contents in channels 246, to add heat to the lower portion 244 of the column and to cool the feed mixture at a plurality of incremental different temperature levels along the length of the lower portion of column 42'.

The remaining portion of about 50% of the compressed saturated feed at 36, indicated at 258, is passed consecutively through each of the four external refrigerators 260, and the partially condensed exiting feed mixture at 262 and 264 are combined at 46 and conducted to refrigerator 48 for further cooling.

In refrigerators 26, 44 (or 236 or 260), 48 and 144, any suitable type of external refrigerant or refrigerating system can be employed. Thus, for example, conventional cascade refrigeration systems known in the art can be employed, using combinations of refrigerants at various pressure levels, such as ethylene, ethane, propylene and various fluorinated hydrocarbons.

Figure 5:
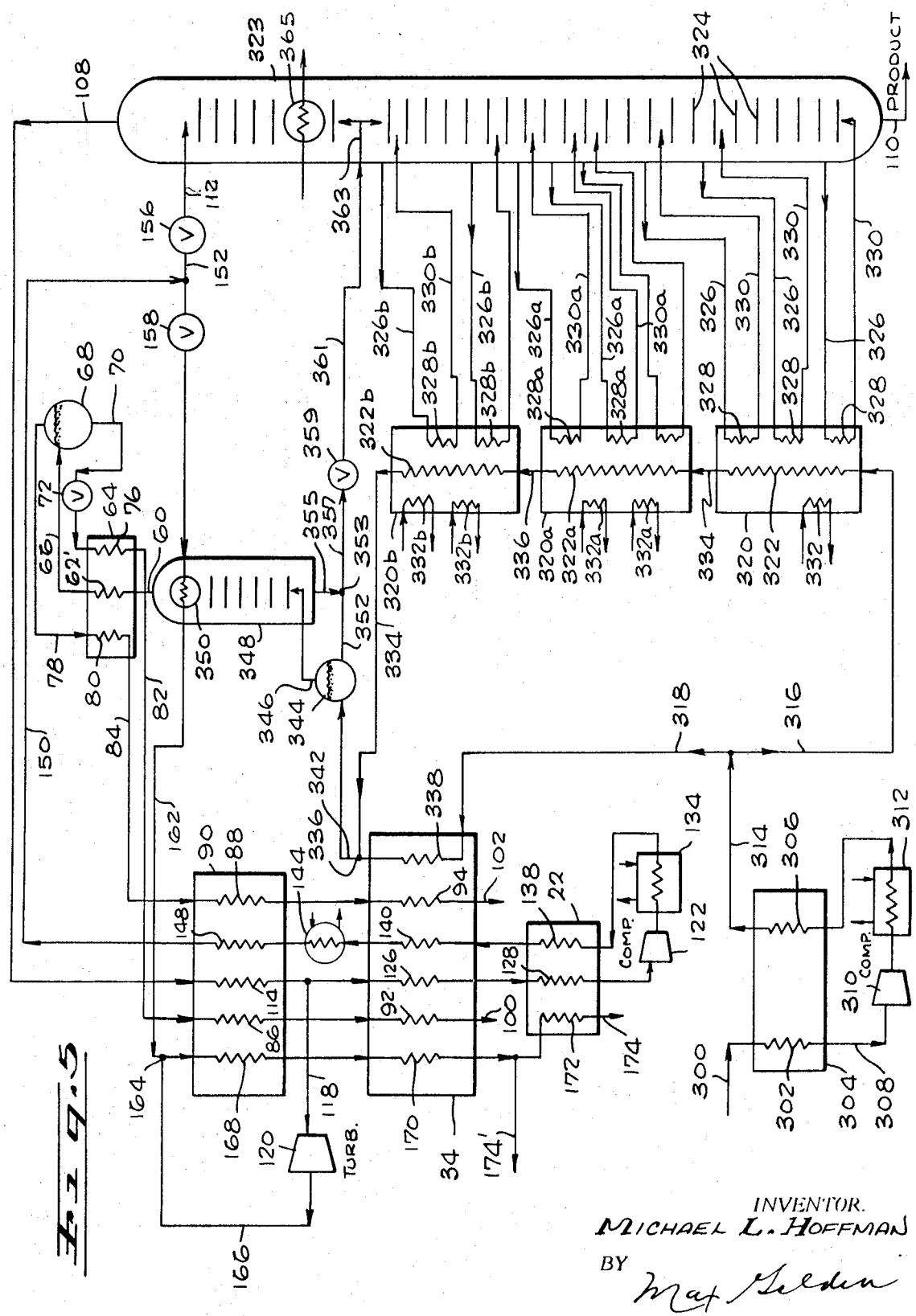
FIG. 5 is a schematic representation of another preferred form of separation system according to the invention.

FIG. 5 is an example of a modified system according to the invention. Referring to FIG. 5, as in the case of FIG. 1, it is desired in this example to separate a feed gas mixture of the composition employed at 10 in FIG. 1, that is, one containing 17% hydrogen, 32% methane, 32% ethylene, 7% ethane, and 12% propylene, into three streams, one containing a major proportion of hydrogen with the remainder methane, another containing essentially pure methane, and a third consisting of ethylene and the remaining heavier hydrocarbons. The feed mixture at 300 is at a pressure of 195 p.s.i.a. and a temperature of 431° R. Such feed mixture is passed through coil 302 of a regenerator 304 in heat exchange relation with further compressed feed mixture passing through coil 306, the exiting feed gas at 308 being at a temperature of 529° R. and 185 p.s.i.a. The feed mixture is then compressed at 310 to a pressure of 270 p.s.i.a. and the further compressed gas feed is then cooled to 541° R. in a water cooler 312, is then further cooled by passage through coil 306 of regenerator 304 to a temperature of 447° R., and the exiting stream at 314 is then split into two streams 316 and 318. The stream 316 (about 91% of the feed) is then passed through a heat exchanger 320 in heat exchange relation with fluid from the lower portion of a main distillation column 323 as described in detail below.

Thus, in heat exchanger 320, heat is exchanged between the column contents and the feed stream passing through coil 322 of the heat exchanger, by removing liquid from various trays 324 in the lower portion of the column at a plurality or multiplicity of temperature levels, as indicated at 326, and partially evaporating such liquid by passage through coils 328 positioned in vertically spaced relation in exchanger 320 and along the column 322, in heat exchange relation with the feed passing through coil 322. The vapor-liquid mixture exiting coils 328 is then injected back into the column at or slightly below the level and corresponding to a somewhat higher temperature level than that from which the respective liquids were withdrawn, as indicated at 330. Also, the feed stream passing through coil 322 is further cooled by an external refrigerant passing through coil 332, between two adjacent coils 328 in which fluid from the column is being vaporized.

The exiting feed stream at 334 is then passed through the second heat exchanger 320a disposed vertically above exchanger 320, and passed through coil 322a in heat exchange relation with liquid removed from several levels as indicated at 326a and passed through coils 328a of exchanger 320a and injected back into the column as indicated at 330a. Also, in the second heat exchanger 320a the feed stream at 322a is further cooled by external refrigerants passing through coils 332a between adjacent coils 328a of the exchanger.

The exiting further cooled feed stream at 336 is then passed through coil 322b of a third heat exchanger 320b in heat exchange relation with liquid removed from different temperature levels from the adjacent portion of the column, as indicated at 326b, and passed through coils 328b of exchanger 320b and reinjected back into the column at 330b. The feed stream passing through coil 322b is further cooled by heat exchange with external refrigerants passing through coils 332b of heat exchanger 320b, coils 332b being disposed between and above coils 328b.

Thus, as noted above, the feed stream 316 is cooled at a multiplicity of points or stages in heat exchangers 320, 320a, and 320b, along and externally of the lower portion of the main distillation column 323, by refrigeration supplied from the column, and from the external refrigerants at 332, 332a and 332b, non-adiabatically, as in the case of the embodiment shown in FIG. 1. Hence, the expression passing the feed mixture in heat exchange relation "along" the lower portion of the distillation column as employed herein, is meant to cover the embodiments of both FIGS. 1 and 5, and denote passage of the feed stream in heat exchange relation with the contents of fluid of the column at a multiplicity of temperature levels along the column, regardless as to whether the feed stream is introduced into heat exchangers positioned internally in the column for heat exchange with the contents thereof at various temperature levels, or is passed externally of the column through several external heat exchangers in heat exchange relation with the liquid contents removed from various levels within the column and returned thereto, as in FIG. 5.

As in the case of the embodiment of FIG. 1, the number of separate heat exchangers indicated at 328, 328a and 328b for the liquid circulated from different temperature levels within the column in heat exchange relation with the feed stream at 322, 322a and 322b, and the number of external refrigeration levels indicated at 332, 332a and 332b can be varied, the number of such heat exchangers 328, 328a and 328b varying from about 3 to about 10, and the number of external refrigeration levels or exchangers 332, 332a and 332b ranging from about 2 to about 5.

It will be understood that the units 320, 320a and 320b containing several heat exchanger coils such as 328 for the fluid from the column or one or more external refrigeration coils such as 332 are for convenience, and that each of the coils 328, 328a or 328b and the adjacent portion of the heat exchange coil for the feed, such as 322, can be individual separate heat exchangers, and that the respective heat exchange coils 332, 332a and 332b for the refrigerant and the adjacent heat exchange feed coil, e.g., 322 can be individual separate heat exchangers.

The cooled partially condensed exiting feed mixture at 334 is recombined at 336 with the minor portion of previously divided compressed cooled feed stream at 318 which had previously been further cooled by passage through coil 338 of heat exchanger 34 in heat exchange relation with cold methane and hydrogen streams at 92 and 94, and the cold methane streams 126 and 170. The combined cooled feed stream at 342 now partially condensed, is introduced into a separator 344 and the vapor from such separator consisting of 52% hydrogen, 43% methane, 5% ethylene is then removed at 346 and is fed to a rectifying column 348 having a condenser 350, where the mixture is separated into vapor overhead at 60, consisting of about 57% hydrogen and 43% methane, and substantially free of ethylene. A liquid bottoms product having a composition of 35% methane and 58% ethylene and 7% ethane, and substantially free of hydrogen, is removed from rectifier 348 at 355.

The liquid 352 from separator 344 is removed and combined at 353 with liquid at 355 from the rectifier 348, and the combined liquid at 357 is passed through throttling valve 359 and is reduced to a pressure of 160 p.s.i.a. the pressure in main distillation column 323. The exiting throttled stream at 361, comprising about 70% of the feed and consisting of about 27% methane, 46% ethylene, 10% ethane and 17% propylene is fed to the column at 363. In the distillation column such feed is separated into an overhead methane vapor at 108, and about 51% of the feed is taken off as a liquid bottom product at 110, consisting of 63% ethylene, 14% ethane and 23% propylene. The compressed cooled feed at 322 passing through exchangers 320, 320a and 320b adds heat to the lower portion of the column at various temperature levels as a result of heat exchange with the liquids removed at various levels within the lower portion of the column and passed through the respective coils 328, 328a and 328b of the heat exchangers 320, 320a and 320b, providing column refrigeration available at sufficiently low temperatures for cooling of the feed. Also, the column 323 has a condenser 365 in the upper portion thereof through which an external refrigerant such as liquid methane is passed to supply additional condensing duty in the upper portion of the column.

The vapor stream 60 from the rectifying column 348, consisting of about 57% hydrogen and about 43% methane, and the overhead methane vapor at 108 from the main rectifying column are treated in substantially the same manner as in the system described above and illustrated in FIG. 1 for producing two product streams, one containing hydrogen and methane and discharged at 100 and 102, and a second stream of pure methane discharged as product at 174 and 174′, and for producing methane reflux recycled at 112 to the top of column 323. However, differing somewhat from the system of FIG. 2, in the system of FIG. 5 it will be noted that the hydrogen and methane streams exiting heat exchanger 34 at 100 and 102 are not passed through heat exchanger 22, and the compressed feed stream 314 is not passed through heat exchanger 22, as shown at 20 in FIG. 1, and in FIG. 5, a portion of the methane stream 174 is taken off at 174' after passage through heat exchanger 34. However, the same numerals employed in FIG. 1 and representing the components in the remainder of the system of FIG. 1 for treatment of the overhead gases 60 and 108 are employed for the corresponding components in FIG. 5.

Figure 6:
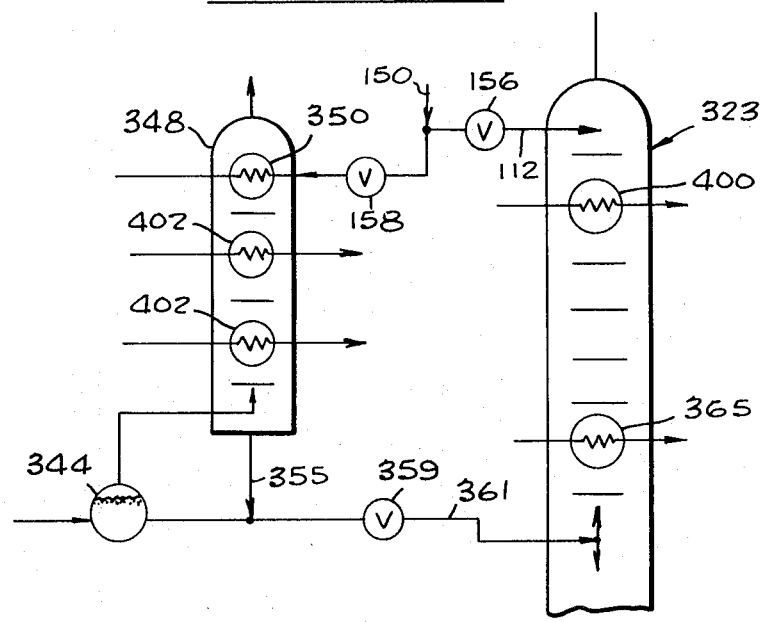
FIG. 6 is a modification of the system of FIG. 5.

In FIG. 6, there is shown a modification of the system of FIG. 5, including the use of an additional condenser 400 in the upper portion of main distillation column 323 and the use of a pair of additional condensers 402 in rectifying column 348. The incorporation of such additional condensers increases the efficiency of the system due to the allowance of higher temperatures for the refrigerant in such condensers. As the refrigerant for such condensers there can be employed, for example, liquid methane. In each of the upper portions of column 323 and in the rectifying column 348, in FIGS. 5 and 6, generally from 0 to 3 condensers such as 365 and 400, or 402, respectively, can be employed.

Figure 7:
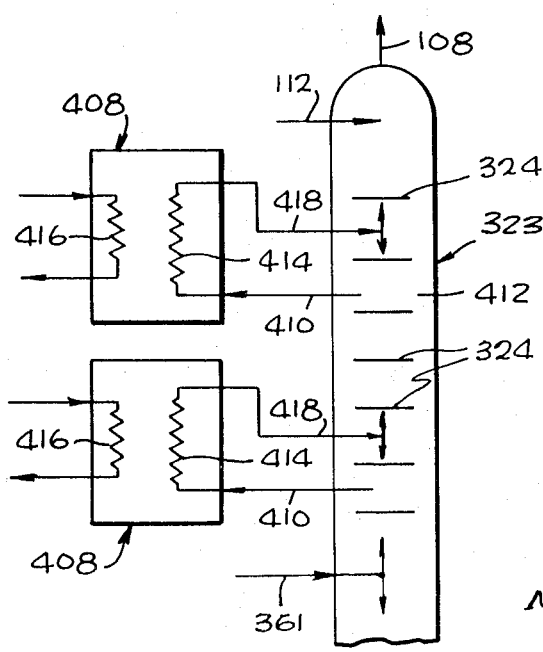
FIG. 7 illustrates another modification of the system of FIG. 6.

FIG. 7 illustrates another modification of the system of FIG. 6, in which one or more external refrigerators or heat exchangers indicated at 408, and shown as two in number, are employed to provide refrigeration for the contents in the upper or rectifying portion of the column. Such refrigerators are employed in place of the condensers 365 and 400 in FIG. 6. Referring to FIG. 7, vapor is removed from different temperature levels, indicated at 410, from the rectifying section 412 of column 323, and the vapor is passed through coils 414 of the heat exchangers 408 in heat exchange relation with external refrigerant such as expanded nitrogen or expanded hydrogen or liquid methane passing through coils 416 of heat exchangers 408, to partially condense the vapor in coils 414, the resulting vapor-liquid mixtures then being returned or injected back into the rectifying portion of the column, as indicated at 418, at substantially the same or a somewhat lower temperature level than the point of removal of the initial vapor at 410 from the column.

In FIG. 5 the refrigerant employed for passage through coils 332 of the heat exchanger units 320 also can be, for example, liquid methane. Other refrigerants such as expanded nitrogen or expanded hydrogen also can be employed as refrigerants at 332, 365, 400 and 402.

It will be understood that combinations of internal and external heat exchangers can be employed for cooling the compressed feed in heat exchange relation with the contents or fluid in the lower portion of the main distillation column. Thus, for example, there can be employed a combination of internal heat exchangers such as 38 in FIGS. 1 and 2, in the main distillation column, together with external heat exchangers such as 322, 328 in FIG. 5.

In the systems of FIGS. 1, 2 and 5, it will also be understood that if desired, expander 120 can be eliminated.

It should be understood also that, if desired, the entire compressed cooled feed mixture at 28 in FIG. 1 or at 314 in FIG. 5 can be introduced into the heat exchangers 38 of FIGS. 1 and 2, or into heat exchange units 320, 320a and 320b of FIG. 5, thus eliminating the divided minor stream 30 or 318 of the compressed cooled feed mixture stream. Also, it will be understood that heat exchangers 22 and 34 in FIGS. 1 and 5 can be combined into a single heat exchanger having suitable cooling capacity.

It will be further understood that the description above of the specific examples of operation described particularly in connection with FIGS. 1, 2 and 5, and the temperatures and pressures noted above are only exemplary and are not intended as limitative of the invention.

It will be recognized also that the process and system of the invention are equally applicable for processing a feed gas mixture containing essentially hydrogen, methane and ethylene, and substantially free of heavier hydrocarbons, so that the resulting product, e.g., recovered at 110 from the main distillation column, contains essentially pure ethylene. When heavier hydrocarbons such as ethane and propylene are present in the feed and are recovered with the ethylene as product at 110, as described, the ethylene can be separated from the heavier hydrocarbons in known manner, e.g., by further fractional distillation.

The term "lower portion" of the distillation column as employed in the specification and claims is intended to denote the stripping section of the column, which is below the point of introduction of the feed mixture into the column.

From the foregoing, it is seen that the invention provides a process and system designed particularly for separation of methane and hydrogen, and ethylene and heavier hydrocarbons, if present, from mixtures thereof, and is particularly directed to demethanizing or removing methane and hydrogen from such mixtures, with high efficiency by recovery of refrigeration from the main distillation column at relatively low temperatures as compared to conventional reboiler temperatures, in conjunction with external refrigeration, and employing non-adiabatic distillation, resulting in substantial reduction in compressor power cost and reduction in heat exchanger requirements.

While I have described particular embodiments of my invention for the purpose of illustration, it should be understood that various additional modifications and adaptations thereof may be made within the spirit of the invention, and hence the invention is not to be taken as limited except by the scope of the appended claims.

I claim:

1. A process for separating hydrogen and methane, and ethylene, from mixtures thereof, which comprises compressing a feed gas mixture containing chiefly hydrogen, methane and ethylene, cooling said compressed feed gas mixture essentially to a saturated vapor, passing said cooled feed gas mixture along and externally of the lower portion of a distillation column in indirect heat exchange relation with fluid removed from a plurality of different temperature levels along the length of the lower fractionating portion of said column and injected back into said column, said feed mixture being cooled during said heat exchange with said fluid by addition of heat to said fluid from said feed mixture, and during said indirect heat exchange of said cooled feed gas mixture with said fluid removed from said column, also passing said cooled feed gas mixture into indirect heat exchange relation with a refrigerant externally of said column at different temperature levels, thereby condensing a portion of said cooled feed gas mixture, separating the resulting cooled partially condensed feed mixture into a vapor consisting essentially of hydrogen and methane, and a liquid consisting essentially of methane and ethylene, introducing said liquid as feed into said distillation column, further separating said separated vapor into a second vapor and a second liquid, said second vapor consisting essentially of hydrogen and methane, and substantially free of ethylene, and said second liquid consisting essentially of methane and ethylene, and substantially free of hydrogen, and introducing said second liquid as a portion of the feed to said distillation column, effecting a separation of said feed in said column into an overhead methane vapor and a liquid bottom product consisting essentially of ethylene, cooling and condensing at least a portion of said overhead methane vapor, and returning said cooled condensed methane as reflux to the top of said distillation column.

2. A process as defined in claim 1, said cooled compressed feed gas mixture being passed in a plurality of different temperature stages vertically in indirect heat exchange relation with said fluid removed from said column, said heat exchange of said cooled feed mixture with external refrigerant being carried out by passage of said feed gas mixture between a plurality of said stages into heat exchange relation with a refrigerant externally of said column, for further cooling said feed gas mixture, and effecting a non-adiabatic distillation and recovery of refrigeration within said column at relatively low temperatures.

3. A process for separating hydrogen and methane, and ethylene, from mixtures thereof, which comprises compressing a feed gas mixture containing chiefly hydrogen, methane and ethylene, cooling said compressed feed gas mixture essentially to a saturated vapor, passing said cooled feed gax mixture along and externally of the lower portion of a distillation column in indirect heat exchange relation with fluid removed from a plurality of different temperature levels along the length of the lower fractionating portion of said column and injected back into said column, said feed mixture being cooled during said heat exchange with said fluid by addition of heat to said fluid from said feed mixture, and during said indirect heat exchange of said cooled feed gas mixture with said fluid removed from said column, also passing said cooled feed gas mixture into indirect heat exchange relation with a refrigerant externally of said column at different temperature levels, thereby condensing a portion of said cooled feed gas mixture, separating the resulting cooled partially condensed feed mixture into a vapor consisting essentially of hydrogen and methane, and a liquid consisting essentially of methane and ethylene, introducing said liquid as feed into said distillation column, further separating said separated vapor by rectification thereof in a rectifying column into a second vapor and a second liquid, said second vapor consisting essentially of hydrogen and methane, and substantially free of ethylene, and said second liquid consisting essentially of methane and ethylene, and substantially free of hydrogen, and introducing said second liquid as a portion of the feed to said distillation column, effecting a separation of said feed in said column into an overhead methane vapor and a liquid bottom product consisting essentially of ethylene, cooling and condensing at least a portion of said overhead methane vapor, and returning said cooled overhead methane vapor as reflux to the top of said distillation column, including cooling said second vapor obtained by rectification, to partially condense said vapor, separating said partially condensed second vapor into a third cold vapor and a third liquid, passing said third vapor and said third liquid in heat exchange relation with said second vapor for cooling and partially condensing same as aforesaid, and passing said exiting third vapor and said exiting third liquid into heat exchange relation with said compressed feed gas mixture for cooling same.

4. A process as defined in claim 3, including passing said overhead methane vapor from said distillation column into heat exchange relation with at least a portion of said compressed feed gas mixture for cooling same, further compressing said methane, cooling said further compressed methane by heat exchange relation with product vapors and by external refrigeration to condense said further compressed methane vapor, and throttling said condensed methane vapor to distillation column pressure prior to introduction of said cooled methane as reflux to said distillation column.

5. A process as defined in claim 4, including work expanding a portion of said overhead methane, passing said cooled work expanded methane in heat exchange relation with said further compressed methane and with at least a portion of said compressed feed gas mixture for cooling same, throttling a portion of said compressed and condensed recirculated methane and passing said throttled methane in heat exchange relation with the upper portion of said rectifying column for cooling same, and passing the vaporized methane from heat exchange relation with said rectifying column into heat exchange relation with said further compressed methane and with at least a portion of said compressed feed gas mixture for cooling same.

6. A process for separating hydrogen and methane, and ethylene, from mixtures thereof, which comprises compressing a feed gas mixture containing chiefly hydrogen, methane and ethylene, cooling said compressed feed gas mixture essentially to a saturated vapor, passing said cooled feed gas mixture along and externally of the lower portion of a distillation column in indirect heat exchange relation with fluid removed from a plurality of different temperature levels along the length of the lower fractionating portion of said column and injected back into said column, said feed mixture being cooled during said heat exchange with said fluid by addition of heat to said fluid from said feed mixture, and during said indirect heat exchange of said cooled feed gas mixture with said fluid removed from said column, also passing said cooled feed gas mixture into indirect heat exchange relation with a refrigerant externally of said column at different temperature levels, thereby condensing a portion of said cooled feed gas mixture, separating the resulting cooled partially condensed feed mixture into a vapor consisting essentially of hydrogen and methane, and a liquid consisting essentially of methane and ethylene, introducing said liquid as feed into said distillation column, effecting a separation of said feed in said column into an overhead methane vapor and a liquid bottom product consisting essentially of ethylene, rectifying said separated vapor in a rectifying column into a second liquid and a second vapor, cooling said second vapor to condense same, separating said condensed vapor into a third vapor consisting essentially of methane and hydrogen and a third liquid consisting essentially of methane, passing said third liquid and said third vapor into heat exchange relation with said second vapor for cooling same, and into heat exchange relation with at least a portion of said compressed feed gas mixture for cooling same, combining said second liquid with said first liquid, said combined liquid being throttled and introduced as feed into said distillation column, passing said overhead methane vapor from said distillation column into heat exchange relation with at least a portion of said compressed feed gas mixture for cooling same, further compressing said exiting methane vapor, cooling said further compressed methane vapor by heat exchange with said third fluid streams, further cooling said compressed methane vapor by external refrigeration, to condense said methane vapor, and throttling said condensed methane prior to introducing same as reflux into the top of said distillation column, throttling a portion of said compressed condensed methane and passing same in heat exchange relation with the upper portion of said rectifying column to provide reflux therein, and passing said exiting vaporized methane in heat exchange relation with at least a portion of said compressed feed gas and with said further compressed methane for cooling same, withdrawing a portion of said overhead methane and work expanding same, and passing said work expanded and cooled methane in heat exchange relation with at least a portion of said compressed feed gas and with said further compressed methane for cooling same.

7. A process as defined in claim 6, including dividing a minor portion of said cooled compressed feed gas mixture, further cooling said minor portion of compressed feed gas mixture by heat exchange with said third fluid streams and with said work expanded and cooled methane, and combining said further cooled compressed minor portion of feed gas mixture with the major portion of said cooled partially condensed feed mixture exiting from heat exchange relation with said fluid removed from the lower portion of said distillation column.

8. A system for separating hydrogen and methane, and ethylene, from mixtures thereof, which comprises means for compressing a feed gas mixture containing chiefly hydrogen, methane and ethylene, means for cooling said compressed feed gas mixture, a distillation column, heat exchange means positioned along the length of the lower fractionating portion of said distillation column externally of said column for passing said compressed feed gas mixture in indirect heat exchange relation with fluid removed from a plurality of different temperature levels in the lower fractionating portion of said distillation column, to cool said feed mixture by addition of heat to said fluid from said feed mixture, means for removing said fluid from said column and introducing said fluid into said heat exchange means, and means for injecting said fluid from said heat exchange means back into said column, refrigeration means externally of said column for also passing said compressed feed mixture into indirect heat exchange relation with a refrigerant for additionally cooling said feed mixture externally of said column at different temperature levels during passage of said compressed feed gas mixture in indirect heat exchange relation with fluid from the lower fractionating portion of said column, to condense a portion of said cooled feed gas mixture, means for separating the resulting cooled partially condensed feed mixture into a first vapor consisting essentially of hydrogen and methane, and a first liquid consisting essentially of methane and ethylene, means for introducing said liquid as feed into said distillation column, means for withdrawing an overhead methane vapor from said column, means for withdrawing a liquid bottom product consisting essentially of ethylene from said column, a rectifying column, means for passage of said separated first vapor into said rectifying column, means for withdrawing a second vapor from said rectifying column, means for cooling said second vapor to partially condense same, means for separating said condensed vapor into a third vapor and a third liquid, means for passing said third liquid and said third vapor into heat exchange relation with said second vapor for said aforementioned cooling of same, means for passing said exiting third fluid streams into heat exchange relation with at least a portion of said compressed feed gas mixture for cooling same, means for combining said second liquid with said first liquid, means for throttling said combined liquid and introducing said throttled liquid as feed to said distillation column, means for cooling and condensing at least a portion of said overhead methane vapor, and means for returning said cooled overhead methane as reflux to the top of said distillation column.

9. A system as defined in claim 8, including means for passing overhead methane vapor from said distillation column into heat exchange relation with at least a portion of said compressed feed gas mixture for cooling same, means for further compressing said methane, means for cooling said further compressed methane to condense said further compressed methane vapor, throttling means for reducing the pressure of said condensed methane vapor to distillation column pressure and further cooling such methane prior to introduction of said cooled methane as reflux to said distillation column.

10. A system as defined in claim 8, including means for passing said overhead methane vapor from said distillation column into heat exchange relation with at least a portion of said compressed feed gas mixture for cooling same, means for compressing said exiting methane vapor, heat exchange means for cooling said further compressed methane vapor in heat exchange relation with said third fluid streams, means for further cooling said compressed methane vapor to condense said methane vapor, means for throttling a major portion of said condensed methane and introducing said throttled methane as reflux into the top of said distillation column, means for by-passing and throttling a minor portion of said compressed condensed methane, means for passing said last-mentioned throttled minor portion of methane in heat exchange relation with the upper portion of said rectifying column as refrigerant therein, means for passing the exiting vaporized methane into heat exchange relation with at least a portion of said compressed feed gas and with said compressed methane, for cooling same, means for withdrawing a portion of said overhead methane prior to compression thereof, means for work expanding said last-mentioned portion of overhead methane, and means for passing said work expanded and cooled methane in heat exchange relation with at least a portion of said compressed feed gas and with said further compressed methane, for cooling same.

11. A system as defined in claim 8, said heat exchange means comprising a plurality of first heat exchangers disposed vertically along and externally of the lower portion of said column, means interconnecting each of said vertically disposed heat exchangers for passage of feed gas mixture through each of said heat exchangers, said fluid removing means comprising a plurality of means each communicating the interior of said column at a different level therein with one of said heat exchangers, and said fluid injecting means comprising a plurality of means each communicating a separate one of said heat exchangers with the interior of said column, said external refrigeration means comprising a plurality of second heat exchangers disposed vertically along and externally of said column for passage of said feed gas mixture in heat exchange relation with an external refrigerant, including means permitting passage of said feed gas mixture in alternate passes through one of said first external heat exchangers and then through one of said second external heat exchangers.

References Cited

UNITED STATES PATENTS

| | | | |
|---|---|---|---|
| 1,460,545 | 7/1923 | Haynes et al. | 62—40 |
| 1,744,421 | 1/1930 | Shoud et al. | 203—100 |
| 2,086,567 | 7/1937 | McCreery | 62—34 |
| 2,502,251 | 3/1950 | Dennis | 62—31 |
| 2,503,265 | 4/1950 | Haynes | 62—28 |
| 2,627,731 | 2/1953 | Benedict | 62—34 |
| 2,661,608 | 12/1953 | Pavlis | 62—38 |
| 2,677,945 | 5/1954 | Miller | 62—31 |
| 2,713,780 | 7/1955 | Williams | 62—31 |
| 2,713,781 | 7/1955 | Williams | 62—31 |
| 2,823,523 | 2/1958 | Eakin et al. | 62—39 |
| 3,258,930 | 7/1966 | Jakob | 62—29 |
| 3,261,168 | 7/1966 | Ruhemann et al. | 62—38 |
| 3,282,060 | 11/1966 | Hays | 62—24 |

WILBUR L. BASCOMB, JR., Primary Examiner

U.S. Cl. X.R.

62—31, 34, 39, 40